United States Patent Office 3,524,838
Patented Aug. 18, 1970

3,524,838
NOVEL POLYMERIZATION METHOD OF VINYL COMPOUND
Minoru Imoto, Okashinmachi, Osakafu, Kiichi Takemoto, Osakafu, and Hiroyuki Sutoh, Kaorigaokamachi, Osakafu, Japan, assignors to Chisso Corporation, Osaka, Japan, an organization of Japan, and Kiichi Takemoto, Osakafu, Japan
Filed Jan. 29, 1968, Ser. No. 701,140
Claims priority, application Japan, Feb. 3, 1967, 42/6,960
Int. Cl. C08f 7/12, 3/64, 3/76
U.S. Cl. 260—88.3    1 Claim

ABSTRACT OF THE DISCLOSURE

A method for polymerizing a vinyl compound which comprises polymerizing a vinyl compound such as 1-vinyl-2-methyl-imidazole, 1-vinyl-2-ethyl imidazole, methyl methacrylate, methyl acrylate, 4-vinyl pyridine, 2-methyl-5-vinyl pyridine, acrylonitrile, styrene, and a mixture thereof, in the presence of (1) an organic polymer having a hydroxy group or amide chain linkages in its molecule such as cellulose, silk or polyvinyl alcohol, (2) carbon tetrachloride or carbon tetrabromide, and (3) water.

BACKGROUND OF THE INVENTION

It has been known that methyl methacrylate, methyl acrylate or the like can be graft-polymerized onto a carbohydrate or its derivative such as starch, dialdehyde starch, maltose or the like, a natural or a synthetic fiber such as cellulose, rayon, jute, silk, wool, polyvinyl alcohol, polyacrylonitrile or the like, in the absence of a catalyst. (cf. J. Chem. Soc. Japan, Ind. Chem. Sec. 68 P1304.)

Further, the polymerization of vinyl compound in the presence of carbon tetrachloride has been known and its detailed disclosure is found in Kobunshi (High Polymers), Japan 15, p. 965. According to this disclosure, N-vinyl carbazole polymerizes in the presence of carbon tetrachloride but this polymerization reaction is inhibited by the presence of water and it hardly copolymerizes with methyl methacrylate.

DESCRIPTION OF THE INVENTION

After comprehensive studies regarding to the group of this reactions, it has been observed by the present inventors that the polymerization reaction proceeds smoothly in the presence of an organic polymer, carbon tetrahalide and water. This reaction has several characteristics which can be clearly differentiated from the above-mentioned prior art. One of them is that a polymer is produced almost without accompanying a graft polymerization and another is that this reaction can be applied widely to a general homo- and co-polymerization of vinyl compound, and further the presence of water is, in contrast to the prior art, rather necessary.

If any one of the above-mentioned three constituents (of an organic polymer, carbon tetrahalide and water) is lacking, the polymerization hardly proceeds in the case of 1-vinyl-2-methyl-imidazole, but the reaction proceeds when all of the three constituents are present even in small amounts. Some vinyl monomers other than 1-vinyl-2-methyl imidazole polymerizes even without the presence of $CCl_4$, but the reactions proceed very rapidly in the presence of $CCl_4$. It is noteworthy that the reaction proceeds in spite of the presence of carbon tetrachloride and the reacted monomeric compound is converted to a high molecular weight polymer.

As for the organic polymers that are useful in the polymerization, those having hydroxy group or amide chain linkages such as cellulose, silk, polyvinyl alcohol and the like are as cellulose, silk, polyvinyl alcohol and the like are illustrative. Those having relatively low polymerization degrees can also be used as the organic polymers. For example, polyvinyl alcohol having a polymerization degree of 4 can be used. In contrast to this, a general low molecular compound containing a hydroxy radical (e.g., ethanol, butanediol—1.3 or the like) hardly initiates the polymerization reaction.

As the carbon tetrahalide, carbon tetrachloride and carbon tetrabromide are illustrative, but the former is preferable. The latter not only reduces the total polymerization yield but also affords colored polymers. The reaction does not proceed at all with other halogenated hydrocarbon.

Figure 1:
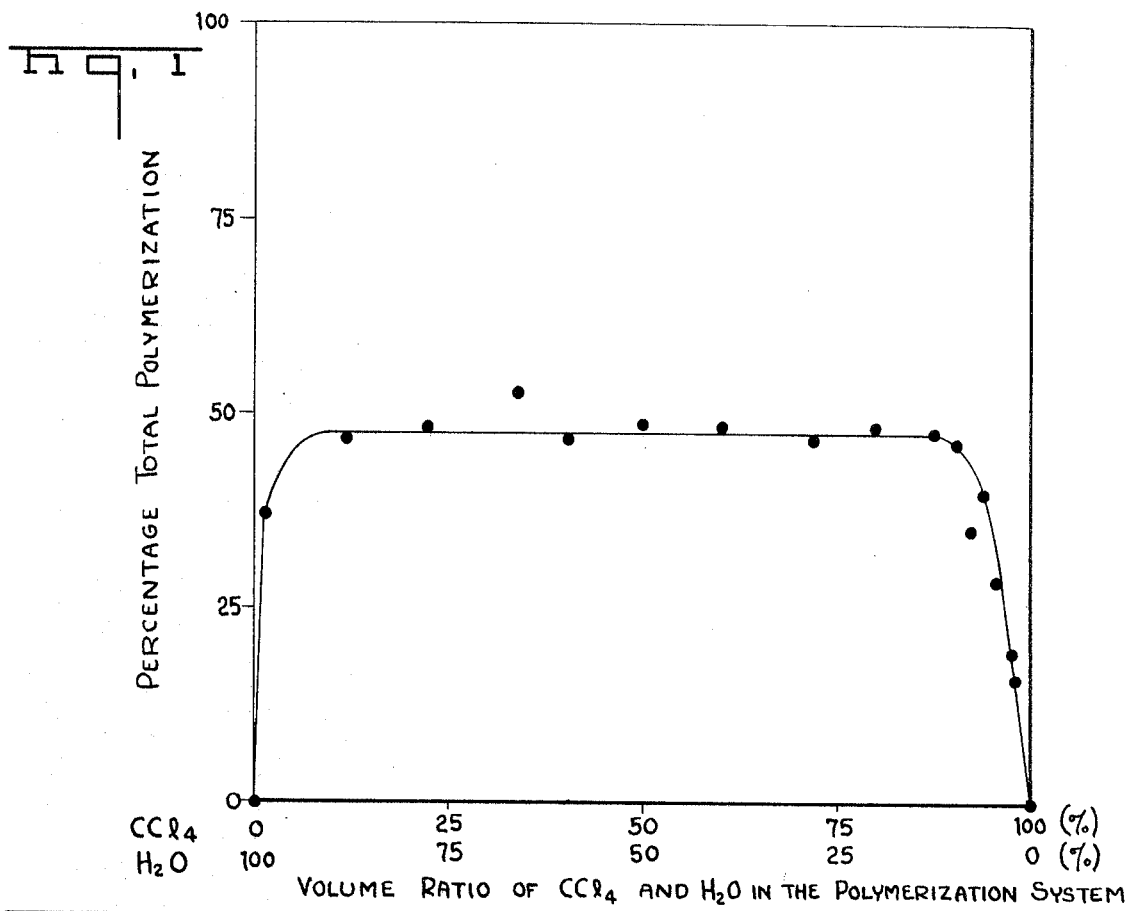
FIG. 1 shows the influence of volume ratios of $CCl_4$ to $H_2O$ in the polymerization system on the total polymerization yield percent in case of the polymerization of 1-vinyl-2-methylimidazole and FIG. 2 shows the influence of proportions of comonomers in the copolymerization reaction of imidazole derivative and methyl methacrylate on the total polymerization yield percent.

As above-mentioned, the reaction proceeds in the presence of an organic polymer, carbon tetrahalide and water, even if each is present in small amounts, but the relative proportion of carbon tetrahalide to water is important. This can be seen concretely in Table 6 and FIG. 1 (FIG. 1 shows an influence of the volume ratio of $CCl_4$ and water upon the total polymerization yield percent in the polymerization system of 1-vinyl-2-methyl imidazole). Further, these show also that the reaction is promoted considerably if carbon tetrachloride and water are anyhow present even when the relative proportion of either of them is small.

Vinyl compounds to be polymerized include common vinyl compounds such as 1-vinyl-2-alkyl imidazole (alkyl=methyl or ethyl), methyl methacrylate, methyl acrylate, 4-vinyl pyridine, 2-methyl-5-vinyl pyridine, acrylonitrile, styrene or the like.

The homopolymerization and the copolymerization of these compounds are greatly influenced by reaction conditions particularly by temperature. 1-vinyl-2-alkyl imidazole (alkyl=methyl or ethyl) polymerizes quite rapidly even at a temperature of 10–40° C. and affords mainly its homopolymer, but does not if even one of the three constituents is deficient. In cases of other vinyl compounds, the reactions proceed at a temperature of 80–90° C. It is a characteristic of these cases that the graft copolymerization is prevented and a homopolymer is produced. For example, if a system consisting of methyl methacrylate, water and cellulose is maintained at a temperature of 85–90° C. for 2–3 hours, a graft copolymerization reaction of methyl methacrylate onto cellulose proceeds at a high polymerization rate. (cf. the disclosure of the above-cited Bulletin of Industrial Chemical Society.) When the reaction is carried out with this system but with the addition of carbon tetrachloride, the polymerization yield percent of methyl methacrylate approaches 100% as indicated in Table 6, but graft copolymerization reaction hardly occurs, and polymethyl methacrylate is produced as a main product. Further in case of acrylonitrile and styrene where even a graft copolymerization occurs in the absence of carbon tetrachloride, the reaction proceeds in accordance with the present method though the polymerization yield percent is relatively low.

The reaction product of the present invention contains a slight amount of a graft copolymer, but the main product is a homopolymer or a copolymer and can be freed of the graft copolymer by extraction with a solvent.

The molecular weight of the polymer obtained in accordance with the present invention is higher than those obtained by the use of a commonly known free radical polymerization catalyst such as azobisisobutyronitrile. However, in view of the fact that the reaction is inhibited by hydroquinone and chlorine, it is considered that the reaction proceeds in accordance with free radical polymerization mechanism.

The product of the present invention can be used for making various shaped articles as in cases of conventional polymers of vinyl compounds.

Following examples are given to illustrate the polymerization method of vinyl compounds carried out in accordance with the present invention.

EXAMPLES

Each of the ingredients employed as raw materials was prepared as follows:

1-vinyl-2-methylimidazole was distilled three times under a nitrogen atmosphere (B.P. 29.2° C./0.06 mm. Hg).

Other vinyl compounds such as methylmethacrylate, acrylonitrile and styrene were prepared by conventional methods.

EXAMPLE 1

The reaction was carried out at 30° C., using 1.02 g. of 1-vinyl-2-methylimidazole as a vinyl compound and purified cellulose as an organic polymer. The results obtained are presented in Table 1.

TABLE 1

| No. | CCl₄(ml.) | H₂O(ml.) | Cellulose (g.) | Polymerisation time (hrs.) | Total yield of polymerization (percent) |
|---|---|---|---|---|---|
| 1 | 1.0 | | | 5 | 0 |
| 2 | | | | 5 | 0 |
| 3 | 1.0 | 2.0 | | 5 | (¹) |
| 4 | | | 0.1 | 5 | 0 |
| 5 | 1.0 | | 0.1 | 5 | 0 |
| 6 | | 2.0 | 0.1 | 5 | 0 |
| 7 | | 2.0 | | 5 | 0 |
| 8 | 1.0 | 2.0 | 0.1 | 1 | 7.9 |
| 9 | 1.0 | 2.0 | 0.1 | 2 | 22.3 |
| 10 | 1.0 | 2.0 | 0.1 | 3 | 38.9 |
| 11 | 1.0 | 2.0 | 0.1 | 4 | 31.5 |
| 12 | 1.0 | 2.0 | 0.1 | 5 | 54.1 |
| 13 | 1.0 | 2.0 | 0.1 | 6 | 58.2 |

¹ Extremely small amounts.

The above results indicate that all of the three compounds, carbon tetrachloride, water and cellulose, are indispensable to effect the polymerization reaction.

EXAMPLE 2

A similar reaction was carried out as in Example 1, except that the amount of cellulose was kept constant and the relative ratios of carbon tetrachloride to water were varied. It took 5 hours for polymerization. The results obtained are presented in Table 2.

TABLE 2

| No. | Cellulose (g.) | CCl₄ (ml.) | H₂O (ml.) | Total yield (g.) | Total yield of polymerization (percent) | Cellulose after extraction (g.) | Graft polymer (g.) | Homopolymer (g.) |
|---|---|---|---|---|---|---|---|---|
| 1 | 0.1000 | 1.0 | 2.0 | 0.5519 | 54.1 | 0.1134 | 0.0134 | 0.5385 |
| 2 | 0.1089 | 4.0 | 1.0 | 0.4851 | 49.5 | 0.1224 | 0.0135 | 0.4716 |
| 3 | 0.1066 | 2.0 | 3.0 | 0.4690 | 46.0 | 0.1184 | 0.0118 | 0.4572 |
| 4 | 0.1059 | 1.0 | 4.0 | 0.5207 | 51.0 | 0.1139 | 0.0080 | 0.5127 |
| 5 | 0.1130 | 0.5 | 4.5 | 0.4799 | 47.0 | 0.1119 | 0 | 0.4799 |
| 6 | 0.1134 | 3.0 | 2.0 | 0.4938 | 48.4 | 0.1150 | 0.0016 | 0.4922 |

Cellulose was prepared by treating tissue paper containing 99.0% of α-cellulose with hot water sufficiently, then treating it three times with a mixture of benzene-methanol (2:1), and drying it on calcium chloride at room temperature.

Silk was obtained by treating a marketed silk by a similar method to that for cellulose, but with an addition of the process to treat the material with 0.1 N NaBH₄ solution prior to the drying process, in order to eliminate free radicals present.

Oligomer of PVA was prepared from "PVA type" polyacetaldehyde which was obtained by polymerization of acetaldehyde in the presence of an alkaline (earth) metals.

High molecular weight PVA was purified by the method described in the Kobunshikagaku (Chemistry of High Polymers), 14, 1939 and 285 (1957).

Other synthetic polymers were purified by repeated precipitations.

Polymerization reactions were carried out by (charging) a specified volume of an organic polymer and a mixture of carbon tetrachloride and water and a vinyl compound into a test tube which had previously been cooled in a Dry Ice-methanol bath, and after the tube was sealed in vacuo, shaking the reaction vessel at a specified temperature for several hours, keeping light out. On the completion of the reaction, the contents were poured into acetone which caused the precipitation of polymer mixture, and the precipitate was extracted with methanol in a Soxhlet extractor for 30 hours. The methanol solution was poured into acetone to give the homopolymer.

Total yields in the above Table 2 are shown in the values in which the weight of cellulose used was subtracted from the weight of the total solids, and they are the sum of the weights of graft polymer and homopolymer. The values of elementary analysis of the homopolymer obtained in No. 5 are N=25.08% and Cl=1.0%. The value of $[\eta]=3.3$ (at 30° C., in 0.1 N HCl) is explicitly greater than $[\eta]=2.5$ of the homopolymer obtained by the polymerization at 60° C. using azo-bis-isobutyronitrile [see Kobunshikagaku (Chemistry of High Polymers), 21, 625 (1964)].

EXAMPLE 3

A similar reaction to that of Example 2 was carried out using 0.1 g. of cellulose, and 5 ml. in total of a mixture of carbon tetrachloride and water, in which the relative ratios of carbon tetrachloride to water were varied further. The results obtained are presented in FIG. 1.

As clearly indicated in the results illustrated in FIG. 1, the polymerization reaction can be initiated by the presence of all of these three ingredients even in small amounts.

EXAMPLE 4

In a reaction using 1-vinyl-2-methylimidazole, other conditions by which the results of polymerization may be affected were examined. The results of the experiment are presented in Table 3. The conditions of polymerization were based upon those of Example 3, except that 2.0 ml. of water and specified amounts of carbon tetrahalides and other halogenated hydrocarbons were used.

TABLE 3

| No. | (Hydro-)carbon halides | Conditions | Total yield of polymerization (percent) |
|---|---|---|---|
| 1 | CCl₄(1.0 ml.) | Light intercepted | 44.3 |
| 2 | CCl₄(1.0 ml.) | Light reflected | 56.8 |
| 3 | CCl₄(1.0 ml.) | 3.4 mg. of hydroquinone added | 1.9 |
| 4 | CCl₄(1.0 ml.) | High purity CCl₄ used | 42.8 |
| 5 | CHCl₃(1.0 ml.) | Light intercepted, distilled CHCl₃ used | 0 |
| 6 | CH₂Cl₂(1.0 ml.) | Light intercepted, distilled CH₂Cl₂ used | 0 |
| 7 | CBr₄ (0.5 ml.) | Light intercepted, distilled CBr₄ used | 5.4 |

Polymer obtained by using CBr₄ was coloured light brown.

EXAMPLE 5

The polymerization reaction was carried out at 30° C. for 5 hours, using 1.02 g. of 1-vinyl-2-methylimidazole, 1.0 ml. of carbon tetrachloride, 2.0 ml. of water and 0.1 g. of various polymers. The results obtained are presented in Table 4.

TABLE 4

| Organic polymer or comparative compound: | Total yield of polymerization, percent |
|---|---|
| Nil | 0 |
| Cellulose | 44.3 |
| Silk | 30.3 |
| Ethanol | 2.8 |
| Butane diol (1.3) | 1.3 |
| PVA ($\bar{P}$=4) | 12.8 |
| PVA ($\bar{P}$=100) | 26.3 |
| PVA ($\bar{P}$=500) | 33.2 |
| PVA ($\bar{P}$=1,700) | 33.5 |
| PVA ($\bar{P}$=2,400) | 52.1 |

EXAMPLE 6

To total 5 ml. of a mixture of methylmethacrylate (MMA) an 1-vinyl-2-methylimidazole (VMI) were added 0.2 g. of cellulose, 2.0 ml. of carbon tetrachloride and 8.0 ml. of water. The reaction was carried out at 30° C. for 5 hours. The results obtained are presented in FIG. 2.

Figure 2:
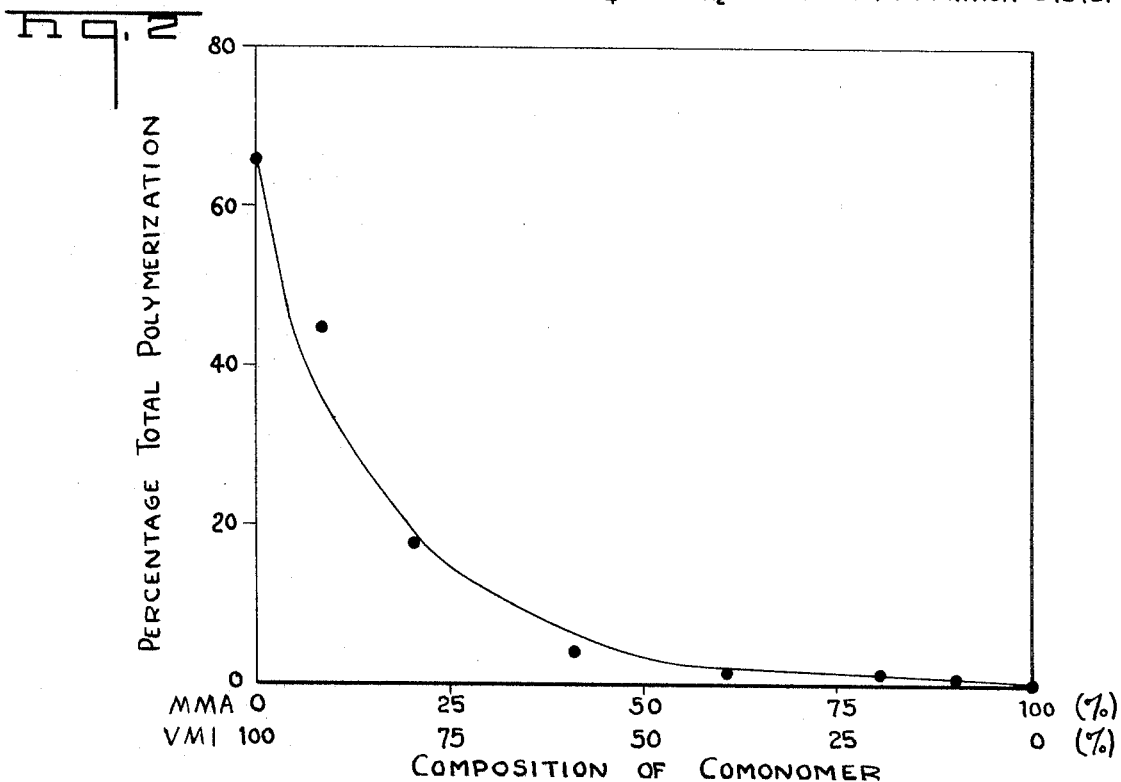

FIG. 2 shows an influence of the composition of co-monomers upon the total polymerization yield (percent) in the copolymerization of 1-vinyl-2-methyl imidazole with methyl methacrylate.

As is clearly shown in the results illustrated in FIG. 2, the total yield (percent) of polymerization decreases rapidly with the increasing molar ratios of methylmethacrylate in the monomer mixture. And at a high proportion of methylmethacrylate, the copolymerization reaction becomes very difficult. This indicates that the reaction differs from the copolymerization reaction catalysed by a usual radical polymerisation catalyst [see Kobunshikagaku (Chemistry of High Polymers), 21, 921 (1964)].

EXAMPLE 7

In a reaction system consisting of 1 ml. of vinyl monomer, 0.1 g. of cellulose, 1.0 ml. of carbon tetrachloride and 2.0 ml. of water, the reaction was carried out at 85° C. for 5 hours, and the results obtained are presented in Table 5.

TABLE 5

| No. | Vinyl monomer | Total yield of polymerization (percent) | Total yield of polymerization when CCl₄ is absent |
|---|---|---|---|
| 1 | Methylmethacrylate | 90.6 | 11.4 |
| 2 | Methylacrylate | 36.0 | 1.7 |
| 3 | Acrylonitrile | 3.0 | 0 |
| 4 | Styrene | 1.7 | 0 |

EXAMPLE 8

In a reaction system consisting of 1.0 ml. of methylmethacrylate, 0.1 g. of cellulose, and total 5.0 ml. of a mixture of carbon tetrachloride and water, the reaction was carried out at 85° C. for 5 hours, in the varied relative ratios of carbon tetrachloride to water. The results obtained are presented in Table 6.

TABLE 6

| CCl₄ (molar percent) | H₂O (molar percent) | Total yield of polymerization (percent) |
|---|---|---|
| 0.0 | 100.0 | 11.4 |
| 6.0 | 94.0 | 98.9 |
| 10.0 | 90.0 | 96.2 |
| 20.0 | 80.0 | 82.3 |
| 30.0 | 70.0 | 72.3 |
| 50.0 | 50.0 | 60.9 |
| 70.0 | 30.0 | 36.6 |

What is claimed is:

1. A polymerization method which comprises polymerizing a vinyl compound selected from the group consisting of 1-vinyl-2-methylimidazole, 1-vinyl-2-ethylimidazole, methyl methacrylate, methyl acrylate, 4-vinyl-pyridine, 2-methyl-5-vinyl-pyridine, acrylonitrile, styrene and a mixture thereof, in the presence of (1) an organic polymer selected from the group consisting of cellulose, silk and polyvinyl alcohol, (2) a carbon tetrahalide selected from the group consisting of carbon tetrachloride and carbon tetrabromide and (3) water, the volume ratio of water to carbon tetrahalide being within the range of about 5:95 to 98:2.

References Cited

UNITED STATES PATENTS 3,006,903   10/1961   Haefner.

OTHER REFERENCES

Breitenbach et al.: Chem. Abs. 61 (1964) p. 8409d.
Scott et al.: Chem. Abs. 61 (1964) p. 8409e.
Imoto et al.: Chem. Abs. 66 (1967) p. 95409q.

HARRY WONG, Jr., Primary Examiner

U.S. Cl. X.R.

260—13, 80.3, 85.5, 86.1, 86.7, 88.1, 88.7, 89.5, 93.5, 875, 881, 885